Patented May 29, 1923.

1,457,131

UNITED STATES PATENT OFFICE.

JOE OLGIERD ZDANOWICH, OF LONDON, ENGLAND.

CELLULOSE ACETATE.

No Drawing.   Application filed November 27, 1922.   Serial No. 603,660.

*To all whom it may concern:*

Be it known that I, JOE OLGIERD ZDANOWICH, a subject of the King of Great Britain and Ireland, and residing at 36 St. James Street, London, S. W. 1, England, have invented certain new and useful Improvements Relating to Cellulose Acetates, of which the following is a specification.

This invention relates to the production of acetylated cellulose, which I term acetose for spinning artificial silk and the like, or for making films directly, that is, without the necessity for precipitating and redissolving.

It includes the production of films and the like from such acetylated cellulose or acetose.

In my Patent No. 1,347,801 I have described a process for producing such films and filaments directly and the present invention is an improvement thereon. In that patent in the specific examples described the amount of glacial acetic acid employed was approximately from 3½ to 5 times the weight of cellulose. According to the present invention I employ a greater quantity of such acid or its equivalent as described below.

This invention consists in an improvement of this process for obtaining acetose in a condition for the direct production of films, filaments and the like by extrusion in or into a coagulating bath, according to which process the first stage is carried out in an acetylating mixture containing about 9 times the weight of cellulose in glacial acetic acid or some other non-precipitating solvent or solvents in such an amount that by the time the process is completed an amount of solvent corresponding to about 9 times the weight of cellulose has been employed.

This invention further consists in reacting on cellulose with halogen acetic acids in their nascent state in an acetylating mixture compounded as described above at a low temperature, preferably about 40° C. to 50° C. in order to diminish as far as possible the hydrolyzing effect of the halogen on cellulose, which is more pronounced at high temperatures, preferably cooling immediately after to about 15° C. to 18° C. and then reacting on the product with a small proportion of sulphuric acid or other strong condensing agent, preferably added in stages. The term nascent as used herein is used in its general sense as referring to the "moment of generation" or "moment of coming into being," and the term "produced in an acetylating mixture in the presence of cellulose" is used in the claims to cover this feature. Further by the term "low temperature" as used in the claims, a temperature such as between 40 and 50 degrees C. or thereabouts, is intended to be covered.

In carrying this invention into effect in one form by way of example I take a quantity of cellulose and introduce it into a mixture of about three times its weight of acetic anhydride with a quantity of glacial acetic acid about nine times its weight. The mixture is raised to a temperature preferably of from 40° C. to 50° C. and chlorine gas is introduced while the mixture is stirred. The vessel containing the mixture is preferably closed and the chlorine is bubbled through slowly, the rate conveniently for a quantity of about a few kilograms of cellulose being such that when measured by bubbling through sulphuric acid at atmospheric pressure 100 to 120 bubbles per minute are delivered. The action is substantially complete when partial or complete disintegration of the cellulose is observed. On completion of the chlorination to the required stage the mixture should be cooled to, say, 15° C. to 18° C. A very small quantity of strong sulphuric acid is then added, the total quantity not exceeding two per cent and I find that from .5 per cent to 1.5 per cent by weight of the cellulose is sufficient. In some cases the mixture should become clear in from two to three hours if the cellulose is normal. In the event of its being found that the cellulose is not clear it is desirable to divide the sulphuric acid into two or more parts and to add it at intervals. In this way variations in the character of the cellulose can be dealt with and a clear solution attained in a reasonable time. As an alternative I take a quantity of cellulose with about three parts by weight of anhydride and only three to three-and-a-half parts by weight of glacial acetic acid; the remaining five parts or thereabouts may be added after the acetylation is completed, in order conveniently to dilute the mixture.

When the solution has become clear it is then utilized directly for the production of films and the like by extrusion through a suitable orifice, or spraying on an endless belt into a coagulating bath, which may be ordinary water, with or without the addition of alkalies or alkaline-earth salts, or any other body, organic or inorganic, at any temperature, capable of coagulating the said acetose.

Although I have referred to the use of glacial acetic acid, as its role in the first stage is that of a solvent only in that stage it may be replaced wholly or partially by a different solvent which does not precipitate the acetose, for example, by formic acid, say to the extent of one-third of the total acid content, or di-ethylidene-diacetyl, say to the extent of 10 to 20 per cent, or a similar amount of tetra-chlor-ethane. In the second stage the glacial acetic acid employed acts as a diluent so that it can there be wholly or partially replaced by any other suitable diluent, for example, formic acid or ethylidene-diacetyl, but whichever solvent or diluent be employed it should be such or should be so added that it does not precipitate nor in any other way interfere with or affect the solution of acetose. Where formic acid is used I have found that a certain amount of cellulose formates is formed in the course of the operation.

In the same way when required for artificial silk or the like the acetylated product (acetose) is extruded directly, through suitable nozzles corresponding to the denier of the silk required into a coagulating bath, the filaments thus formed being taken off by the usual devices.

The films or filaments thus produced are found to be transparent and of high quality.

By this process an extremely easily handled acetylated product (acetose) capable of producing films and threads by direct extrusion into a coagulating bath is obtained.

Having now described my invention what I claim as new and desire to secure by Letters Patent is:—

1. An improved process for obtaining acetose in a condition for the direct production of films, filaments and the like by extrusion in or into a coagulating bath according to which the acetose is formed by reacting on cellulose with halogen acetic acids produced in the presence of cellulose in an acetylating mixture containing a large proportion of a non-precipitating solvent, namely, about nine times the weight of the cellulose, reaction being completed in the presence of a small proportion of a strong condensing agent, namely, not more than about 2 per cent of the weight of the cellulose.

2. An improved process for obtaining acetose in a condition for the direct production of films, filaments and the like by extrusion in or into a coagulating bath according to which the acetose is formed by reacting on cellulose with halogen acetic acids produced in the presence of cellulose in an acetylating mixture containing glacial acetic acid to an amount about nine times the weight of the cellulose, reaction being completed in the presence of from .5 to about 2 per cent of sulphuric acid.

3. A process as claimed in claim 1, in which the acetylating mixture contains a small proportion of non-precipitating solvent, namely, an amount equivalent to about three times the weight of the cellulose employed, the reaction being completed in the presence of a small proportion of a strong condensing agent, an amount of non-precipitating liquor to make the full quantity about nine times the weight of the cellulose being subsequently added.

4. In a process for the manufacture of acetose in two stages effecting the primary halogenation at a low temperature to minimize hydrolysis of the cellulose, then cooling and subsequently effecting the secondary acetylation in the presence of a small proportion of a strong condensing agent.

5. In a process for the manufacture of acetose in two stages, effecting the primary halogenation at a low temperature to minimize hydrolysis of the cellulose, then cooling and subsequently effecting the secondary acetylation in the presence of a small proportion of sulphuric acid.

6. A method for the production of acetose involving the employment of a small quantity of a strong condensing agent in which this condensing agent is added in stages.

7. A process of manufacturing acetose which comprises acting on cellulose with halogen acids produced in the presence of cellulose in an acetylating bath containing a non-precipitating solvent in amount greater than five times the weight of the cellulose at a low temperature.

In testimony whereof I have signed my name to this specification.

JOE OLGIERD ZDANOWICH.